(12) United States Patent
Saeki et al.

(10) Patent No.: US 7,828,663 B2
(45) Date of Patent: Nov. 9, 2010

(54) TORQUE FLUCTUATION ABSORBING APPARATUS

(75) Inventors: Tomohiro Saeki, Anjo (JP); Makoto Takeuchi, Obu (JP); Masanori Suzuki, Kariya (JP); Yasuhiro Enya, Toyohashi (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 397 days.

(21) Appl. No.: 11/979,805

(22) Filed: Nov. 8, 2007

(65) Prior Publication Data

US 2008/0105512 A1    May 8, 2008

(30) Foreign Application Priority Data

Nov. 8, 2006 (JP) ............................. 2006-302790

(51) Int. Cl.
*F16D 7/02* (2006.01)
(52) U.S. Cl. ....................................................... 464/46
(58) Field of Classification Search ............. 464/42–48; 192/107 C
See application file for complete search history.

(56) References Cited

U.S. PATENT DOCUMENTS

| 7,207,887 B2 | 4/2007 | Nakagaito et al. |
| 2005/0067249 A1* | 3/2005 | Nakagaito et al. |
| 2007/0155513 A1 | 7/2007 | Nakagaito et al. |

FOREIGN PATENT DOCUMENTS

JP    2005-127507 A    5/2005

* cited by examiner

*Primary Examiner*—Greg Binda
(74) *Attorney, Agent, or Firm*—Buchanan Ingersoll & Rooney PC (57) ABSTRACT

A torque fluctuation absorbing apparatus including a limiter mechanism includes: a disc member connected to one of the driving-side member and the driven-side member, a first plate and a second plate connected to the other one of the driving-side member and the driven-side member; a frictional member fixed to the disc member and interposed between the first plate and the second plate, the frictional member including a frictional surface slidably in contact with the first and second plates. The frictional member includes a fibrous substrate and is formed with a plurality of grooves at the frictional surface. A minimum dimension between two adjacent grooves from among the plurality of grooves is designed to be greater than or equal to 2 mm and smaller than or equal to 7 mm.

10 Claims, 10 Drawing Sheets

FIG. 3B  III-III

Comparative example

TORQUE FLUCTUATION ABSORBING APPARATUS

CROSS REFERENCE TO RELATED APPLICATIONS

This application is based on and claims priority under 35 U.S.C. §119 to Japanese Patent Application 2006-302790, filed on Nov. 8, 2006, the entire content of which is incorporated herein by reference.

FIELD OF THE INVENTION

The present invention relates to a torque fluctuation absorbing apparatus.

BACKGROUND

In a hybrid driving apparatus having an engine and an electric motor as a driving sources, a torque fluctuation absorbing apparatus is provided at output shafts of the engine or/and the electric motor. The torque fluctuation absorbing apparatus is adjusted to absorb or damp fluctuations in the torque generated by the engine and the electric motor. JP2005-127507A discloses therein a torque fluctuation absorbing device including a first rotational member transmitted with a torque from a driving power source, a damping mechanism connected to an input shaft of a transmission and having frictional members of an approximately annular-shaped fixed at both surfaces of a disc, and a limiter portion frictionally engaging the frictional members with the first rotational member in a direct manner or in an indirect manner via frictional plates. In this torque fluctuation absorbing device, each of the frictional members has, on its frictional surface, a non-frictional area at a ratio of substantially between 20 percent and 80 percent (inclusive 20 and 80 percents) relative to the entire area of the frictional surface. The non-frictional area may be a groove. The frictional member is adhered to a disc and includes a reinforcing material which is more rigid than the frictional member, thereby increasing rigidness of the frictional member. The reinforcing material is generally reinforcing fibers.

However, a vicinity of such reinforcing fiber exhibits high absorbency and low rust-resistance. Therefore, an occurrence of rust caused by water invasion may unnecessarily lead a slip torque of the limiter portion to more than a predetermined torque.

Further, although the above-described torque fluctuation absorbing apparatus includes a groove formed in the frictional member, the groove is formed to reduce deterioration with age, which deterioration occurs due to a slidable movement of the frictional material. In other words, the groove needs to be considered if it is appropriate in terms of rust-resistance.

Still further, in the above-described torque fluctuation absorbing apparatus, the frictional member is adhered to the disc, which increases a manufacturing cost. Moreover, the adhesion requires a long processing time and a preparation in advance. The frictional member may be secured to disc by a conventionally known riveted structure such as a clutch at a lower manufacturing cost, and however the following matter still remain to be improved.

First of all, an increase in the ratio of the reinforcement fiber included in the frictional member, which leads to reinforcement of the frictional member, introduces occurrences of rusts. Secondarily, the frictional member is generally drilled to be caulked. In this case, the reinforcement fiber may be cut unfavorably and the rigidity of the frictional member is deteriorated. Thirdly, the width (the difference between the inner diameter and the outer diameter) and the thickness of the frictional member may be increased. This increases a space and cost required to the frictional member. Fourthly, the increase in the width of the frictional member may advance deterioration with age of the frictional member slidably movable.

A need thus exists for a torque fluctuation absorbing apparatus which is not susceptible to the drawback mentioned above.

SUMMARY OF THE INVENTION

According to an aspect of the present invention, a torque fluctuation absorbing apparatus includes a limiter mechanism arranged between a driving-side member and a driven-side member. The limiter mechanism is configured to transmit a relative torque generated between the driving-side member and the driven-side member and to discontinue a transmission of the relative torque greater than a predetermined value. The limiter mechanism includes: a first plate connected to the other one of the driving-side member and the driven-side member; a second plate connected to the other one of the driving-side member and the driven-side member; a frictional member fixed to a disc member connected to one of the driving-side member and the driven-side member and interposed between the first plate and the second plate, the frictional member including a frictional surface slidably in contact with the first and second plates. The frictional member includes a fibrous substrate and formed with a plurality of grooves at the frictional surface. A minimum dimension between two adjacent grooves from among the plurality of grooves is designed to be greater than or equal to 2 mm and smaller than or equal to 7 mm.

According to another aspect of the present invention, a torque fluctuation absorbing apparatus includes a limiter mechanism arranged between a driving-side member and a driven-side member. The limiter mechanism being configured to transmit a relative torque generated between the driving-side member and the driven-side member and to discontinue a transmission of the relative torque greater than a predetermined value. The limiter mechanism includes: a first plate connected to the other one of the driving-side member and the driven-side member; a second plate connected to the other one of the driving-side member and the driven-side member; a frictional member fixed to a disc member connected to one of the driving-side member and the driven-side member and interposed between the first plate and the second plate, the frictional member including a frictional surface slidably in contact with the first and second plates. The frictional member includes a fibrous substrate and formed with a plurality of bores having bottoms respectively at the frictional surface, the bores being formed at the quantity of sixty or more and into a predetermined shape.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of a torque fluctuation absorbing apparatus according to the present invention will be described hereinafter with attached drawings.

A first embodiment of a torque fluctuation absorbing apparatus according to the present invention will be described hereinafter with attached drawings.

Figure 1:
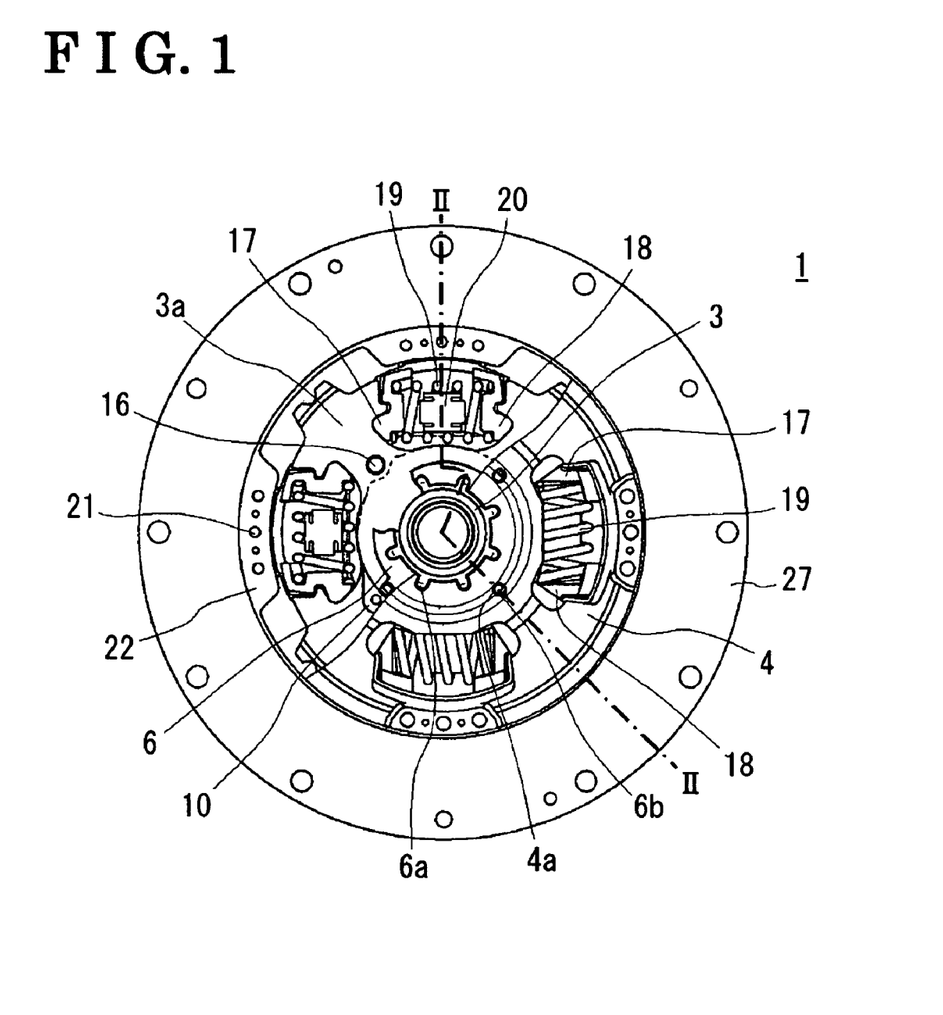
FIG. 1 is a cutout plan view schematically illustrating a structure of a torque fluctuation absorbing apparatus according to a first embodiment of the present invention.
Figure 2:
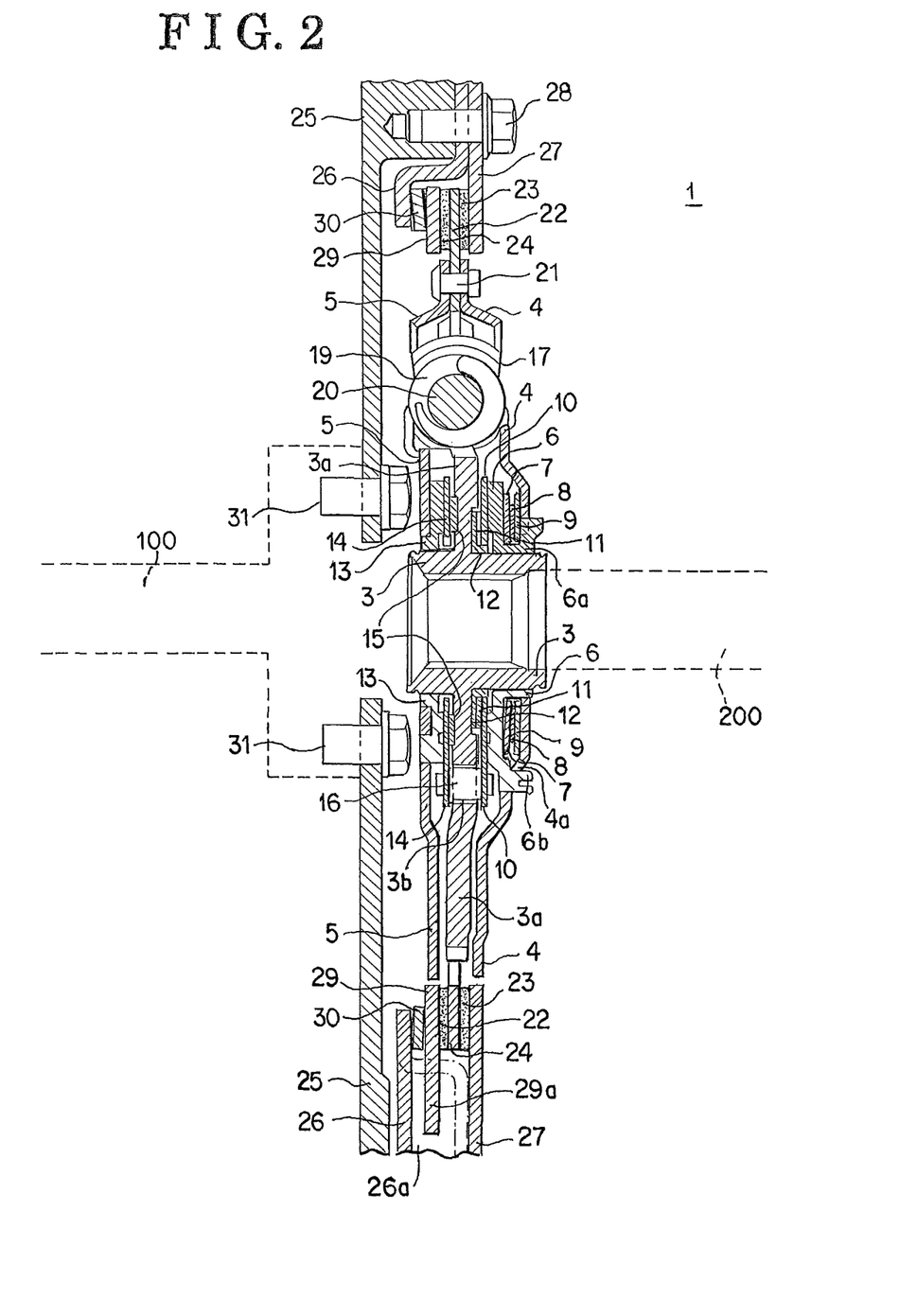
FIG. 2 is a cross-sectional view schematically illustrating the structure of the torque fluctuation absorbing apparatus taken along a line II-II in FIG. 1.
Figure 3A:
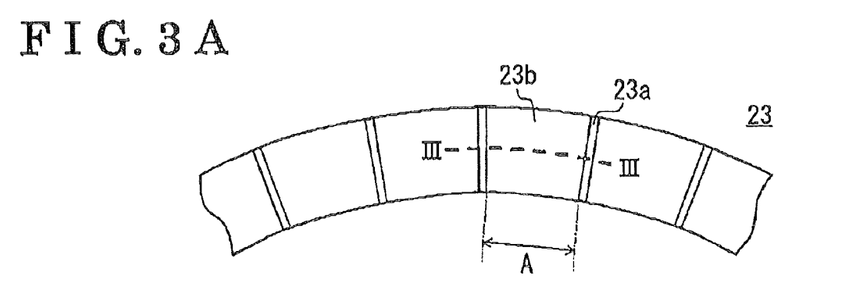
FIG. 3A is a partial plan view schematically illustrating the structure of a frictional member of the torque fluctuation absorbing apparatus according to the first embodiment.
Figure 3B:
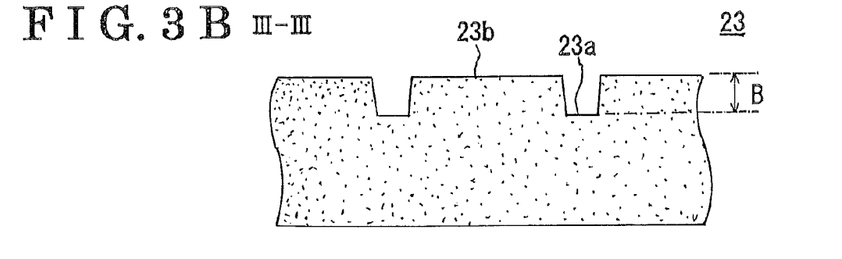
FIG. 3B is a partially sectional view taken along a line III-III in FIG. 3A.

FIG. 1 is a cutout plan view schematically illustrating a structure of the torque fluctuation absorbing apparatus, generally indicated by reference numeral 1, according to the first embodiment of the present invention FIG. 2 is a cross-sectional view schematically illustrating the structure of the torque fluctuation absorbing apparatus 1 taken along a line II-II in FIG. 1 according to the first embodiment. FIG. 3A is a plan view schematically illustrating a structure of a frictional member of the torque fluctuation absorbing apparatus according to the first embodiment. FIG. 3B is a sectional view of the frictional member taken along a line III-III in FIG. 3A. In FIG. 1, bolts 28 are not illustrated.

For example in a hybrid driving apparatus, the torque fluctuation absorbing apparatus 1 according to the first embodiment is provided between an output shaft 100 of an engine (not illustrated) and an input shaft 200 of a transmission (not illustrated). The output shaft 100 serves as a driving-side member and the input shaft 200 serves as a driven-side member. The torque fluctuation absorbing apparatus is employed for absorbing or damping fluctuations in the torque generated by the engine and an electric motor (not illustrated). The torque fluctuation absorbing apparatus 1 is operated to absorb or reduce a torque fluctuation and is configured with a hub member 3, a side plate 4, a side plate 5, a thrust member 6, a disc spring 7, an intermediate plate 8, a disc spring 9, a control plate 10, a disc spring 11, thrust members 12 and 13, a control plate 14, a thrust member 15, pin members 16, spring sheets 17 and 18, coil springs 19, elastic members 20, rivets 21, an intermediate plate 22, frictional members 23 and 24, a rotational member 25, a support plate 26, a cover plate 27, the bolts 28, a pressure plate 29, a disc spring 30 and bolts 31.

As best shown in FIGS. 1 and 2, the hub member 3 is a member radially inwardly spline-engaged with the output shaft (not illustrated) of the electric motor (not illustrated). The hub member 3 includes a flange portion 3a extending radially outwardly. The flange portion 3a is formed with windows at its radially intermediate area. Each window of the flange portion 3a is provided for accommodating therein the coil spring 19, the spring sheet 17, the spring sheet 18 and the elastic member 20. Both circumferential ends of each window of the flange portion 3a make contacts with, and are separated form the spring sheets 17 and 18, respectively. The flange portion 3a is slidably in contact with the thrust member 12 at the surface at the side of the side plate 4 and is slidably in contact with the thrust member 15 at the other surface at the side of the side plate 5. The flange portion 3a is further formed with windows 3b into which the pin members 16 are inserted. The dimension of each window 3b is greater than the diameter of the axially intermediate portion of the pin member 16, so that the relative rotation of the flange 3a and the pin member 16 is guided by the window 3b.

The side plate 4 is an annular plate member formed into a predetermined shape (see FIGS. 1 and 2). With reference to FIG. 2, the side plate 4 is provided at the axially right side of the flange portion 3a (the right side in FIG. 2). The side plate 4 includes a plurality of recesses at an inner periphery. The plurality of recesses of the side plate 4 are fitted with a plurality of detent portions 6a of the thrust member 6, respectively, so that the side plate 4 is prohibited from rotating relative to the thrust member 6 and is allowed to move in the axial direction. The side plate 4 is in contact with one end of the disc spring 9 at the surface at the side of the flange portion 3a (left surface in FIG. 2). The side plate 4 is formed with sockets 4a, into which engagement portions 6b of the thrust member 6 are inserted, radially outwardly relative to the contact portion between the side plate 4 and the disc spring 9. Therefore, the side thrust member 6 is prevented from dropping off. The side plate 4 includes windows at its radially intermediate portion. Each window of the side plate 4 is provided for accommodating the coil spring 19, the spring sheet 17, the spring sheet 18 and the elastic member 20. Both circumferential ends of each window of the flange portion 3a make contacts with, and are separated form the spring sheets 17 and 18, respectively. The side plate 4 is secured to the side plate 5 and the intermediate plate 22 by means of the rivets 21 at a radially outer portion relative to the coil springs 19.

The side plate 5 is an annular plate member formed into a predetermined shape (see FIG. 2). With reference to FIG. 2, the side plate 5 is provided at axially left side of the flange portion 3a. The side plate 5 is in contact with the thrust member 13 at the surface at the side of the flange portion 3a at the vicinity of the inner periphery of the side plate 5. The side plate 5 includes bores fitted with detent portions of the thrust member 13, so that the side plate 5 is prohibited from rotating relative to the thrust member 13 and allowed to move in the axial direction. The side plate 5 includes windows at a radially intermediate portion. Each window of the side plate 5 is provided for accommodating the coil spring 19, the spring sheet 17, the spring sheet 18 and the elastic member 20. Both circumferential ends of each window of the flange portion 3a make contacts with, and are separated form the spring sheets 17 and 18, respectively. The side plate 5 is secured to the side plate 4 and the intermediate plate 22 by means of the rivets 21 at a radially outer portion relative to the coil springs 19.

The thrust member 6 is provided at an outer periphery of the hub member 3 and arranged between the disc spring 7 and the control plate 10 (see FIGS. 1 and 2). The thrust member 6 is slidably in contact with the control plate 10. The thrust member 6 is biased towards the control plate 10 by the disc spring 7. The thrust member 6 includes the detent portions 6a extending from the radially inner portion towards the side plate 4. The detent portions 6a of the thrust member 6 are provided for prohibiting the thrust member 6 from rotating relative to the side plate 4, the disc springs 7, 9, and the intermediate plate 8 and for allowing the thrust member 6 to move in the axial direction. The thrust member 6 is formed with the engagement portions 6b inserted into the sockets 4a of the side plate 4. Each engagement portion 6b is formed with a claw for preventing the thrust member from dropping off the side plate 4.

The disc spring 7 is provided at a radially outer surface of the thrust member 6 and arranged between the thrust member 6 and the intermediate plate 8 (see FIG. 2). The disc spring 7 biases the thrust member 6 towards the control plate 10. The disc spring 7 is formed with recesses at an inner periphery, the recesses respectively corresponding to the detent portions 6a of the thrust member 6. The detent portions 6a of the thrust member 6 are fitted into the recesses of the disc spring 7, respectively, so that the disc spring 7 is prohibited from rotating relative to the thrust member 6 and allowed to be move in the axial direction.

The intermediate plate 8 is a ring-shaped member provided at radially outer surface of the thrust member 6 and arranged between the disc springs 7 and 9 (see FIG. 2). The intermediate plate 8 receives a biasing force of the disc spring 9 and acts to push the disc spring 7 towards the thrust member 6. The intermediate plate 8 is formed with recesses at an inner periphery, the recesses respectively corresponding to the detent portions 6a of the thrust member 6, respectively. The detent portions 6a of the thrust member 6 are fitted into the recesses of the intermediate plate 8, respectively, so that the intermediate plate 8 is prohibited from rotating relative to the thrust member 6 and allowed to move in the axial direction.

The disc spring 9 is provided at a radially outer surface of the thrust member 6 and arranged between the side plate 4 and the intermediate plate 8 (see FIG. 2). The disc spring 9 biases the disc spring 7 towards the control plate 10 via the intermediate plate 8. The disc spring 9 is formed with recesses at an inner periphery, the recesses respectively corresponding to the detent portions 6a of the thrust member 6. The detent portions 6a of the thrust member 6 are fitted into the recesses of the disc spring 9, respectively, so that the disc spring 9 is prohibited from rotating relative to the thrust member 6 and allowed to move in the axial direction.

The control plate 10 is a ring-shaped plate provided at a radially outer surface of the thrust member 12 and arranged between the disc spring 11 and the thrust member 6 (see FIG. 2). The control plate 10 is biased by the disc spring 11 towards the thrust member 6 and is slidably in contact with the thrust member 6. The control plate 10 is formed with recesses at an inner periphery, the recesses corresponding to detent portions of the thrust member 12. The detent portions of the thrust member 12 are fitted into the recesses of the control plate 10, respectively, so that the control plate 10 is prohibited from rotating relative to the thrust member 12 and allowed to move in the axial direction. The control plate 10 is fixedly staked with the pin members 16 at a vicinity of its outer periphery, hence the control plate 10 is structured to be integral with the control plate 14 by means of the pin members 16.

The disc spring 11 is provided at a radially outer surface of the thrust member 12 and arranged between the control plate 10 and the thrust member 12 (see FIG. 2). The disc spring 11 biases the control plate 10 towards the thrust member 6. The disc spring 11 is formed with recesses at an inner periphery, the recesses corresponding to the detent portions of the thrust member 12. The detent portions of the thrust member 12 are fitted into the recesses of the disc spring 11, respectively, so that the disc spring 11 is prohibited from rotating relative to the thrust member 12 and allowed to move in the axial direction.

The thrust member 12 is provided at the outer periphery of the hub member 3 and arranged between the disc spring 11 and the flange portion 3a of the hub member 3 (see FIG. 2). The thrust member 12 is biased by the disc spring 11 towards the flange portion 3a of the hub member 3 and is slidably in contact with the flange portion 3a. The thrust member 12 is formed with detent portions extending from the radially inner portion towards the thrust member 6. Therefore, the thrust member 12 is prohibited from rotating relative to the disc spring 11 and the control plate 10 and is allowed to move in the axial direction.

As illustrated in FIG. 2, the thrust member 13 is provided at the outer periphery of the hub member 3 and arranged between the side plate 5 and the control plate 14. The thrust member 13 is slidably in contact with the control plate 14. The thrust member 13 includes detent portions extending from the inner periphery towards the side plate 5 at positions corresponding to the bores formed at the side plate 5. The detent portions of the thrust member 13 are fitted into the bore portions formed at the side plate 5, respectively, hence the thrust member 13 is prohibited from rotating relative to the side plate 5 and allowed to move The control plate 14 is a ring-shaped member provided at the outer periphery of the hub member 3 and arranged between the thrust members 13 and 15 (see FIG. 2). The control plate 14 is slidably in contact with the thrust members 13 and 15. The control plate 14 is fixedly staked with the pin members 16 at a vicinity of an outer periphery, hence the control plate 14 is structured to be integral with the control plate 10 by means of the pin members 16.

The thrust member 15 is provided at the outer periphery of the hub member 3 and arranged between the control plate 14 and the flange portion 3a of the hub member 3. The thrust member 15 is slidably in contact with the flange portion 3a and the control plate 14.

The pin members 16 are provided for integrally fixing the control plates 10 and 14 (see FIG. 2). The control plate 14 is fixedly staked to the pin members 16 at the vicinity of the outer periphery at the side of the side plate 5. As described above, the pin members 16 are staked to the control plate 10 at the side of the side plate 4. Still as described above, the axially intermediate portion of the pin member 16, of which a dimension is large, is not fixed to the flange portion 3a of the hub member 3, so that the pin members 16 are movable within the windows 3b of the flange portion 3a.

The spring sheets 17 and 18 are components configuring a damper mechanism. As illustrated in FIG. 2, the spring sheets 17 and 18 are housed in each window formed at the flange portion 3a of the hub member 3 and the side plates 4 and 5. The spring sheet 17 is provided between one end portion of the coil spring 19 and one circumferential end of the window. The spring sheet 18 is provided between the other end portion of the coil spring 19 and the other circumferential end of the window.

The coil springs 19 are also the components configuring the damper mechanism. As illustrated in FIGS. 1 and 2, each coil spring 19 is accommodated in the window formed at the side plate 4, the side plate 5, and the flange portion 3a of the hub member 3 and is in contact with the corresponding spring sheets 17 and 18 which are provided at both ends of the coil springs 19, respectively. The coil springs 19 contract when the side plates 4, 5 and the flange portion 3a of the hub member 3 are relatively moved, and absorbs a shock generated due to rotational speed differences among the side plates 4, 5 and the flange portion 3a.

The elastic members 20 are also components configuring the damper mechanism. Each elastic member 20 is provided at an inner peripheral side of the corresponding coil spring 19. When the corresponding coil spring 19 contracts, each elastic member 20 makes a contact with the corresponding spring sheets 17 and 18, which face the elastic member 20, and absorbs the shock generated due to rotational speed differences among the side plates 4, 5 and the flange portion 3a.

The rivets 21 are provided for integrally securing the side plates 4, 5 and the intermediate plate 22 (see FIGS. 1 and 2).

The intermediate plate 22 is an annular-shaped disc member, which is arranged between the side plates 4, 5 and secured thereto by means of the rivets 21 (see FIGS. 1 and 2). The intermediate plate 22 is one of components configuring a limiter mechanism. The intermediate plate 22 extends radially outwardly and reaches between the cover plate 27 and the pressure plate 29. The intermediate plate 22 is riveted with the frictional members 23 and 24 at the radially outer portion of both surfaces of the intermediate plate 22. The intermediate plate 22 is connected to the input shaft 200 of the transmission (not illustrated).

The frictional member 23 is an annular-shaped plane member provided between the intermediate plate 22 and the cover plate 27 and fixed to the intermediate plate 22 by means of rivets not illustrated (see FIG. 2). The frictional member 23 is one of components structuring the limiter mechanism. The frictional member 23 is slidably in contact with the cover plate 27 at its frictional surface 23b (see FIGS. 3A and 3B). The frictional member 23 is press-molded and includes a fibrous substrate, resin and friction modifier. The fibrous fiber. The resin is impregnated into the fiber substrate and is represented for example by thermosetting resin (e.g., phenol plastics) and rubber. The friction modifier is contained in the resin and is represented for example by additives such as cashew dust and peroxide (e.g., manganese dioxide). The frictional member 23 includes a frictional surface 23b facing the cover plate 27, which frictional surface 23b is formed with multiple and linear-type grooves 23a extending in a radial direction from an inner periphery to an outer periphery of the frictional member 23. Because a mold is pulled upwardly in FIG. 3B out of the groove 23a press-molded, the side walls of each groove 23 incline to open in a circumferential direction towards the corresponding frictional surface 23b. The shortest circumferential length A (minimum dimension) defined between the two adjacent grooves 23a on the frictional surface 23b is designed to be greater than or equal to 2 mm and smaller than or equal to 7 mm. The shortest circumferential length A is preferably designed to be greater than or equal to 4 mm and smaller than or equal to 7 mm. The dimension, i.e., the depth B, of the groove 23a is designed to be greater than or equal to 5 percent and smaller than or equal to 75 percent of the shortest circumferential length A. The depth of the groove 23a is preferably designed to be greater than or equal to 5 percent and smaller than or equal to 50 percent of the shortest circumferential length A. When the shortest circumferential length A and the depth of the groove 23a are designed within the predetermined dimensional ranges respectively, it is possible to ensure stiffness of the frictional member 23 and to reduce the ratio of the fiber exposed on the surface of the frictional member 23. It is hence possible to improve rust-resistance of the frictional member 23.

The frictional member 24 is an annular-shaped member provided between the intermediate plate 22 and the pressure plate 29 and fixed to the intermediate plate 22 by means of rivets not illustrated (see FIG. 2). The frictional member 24 is one of the contact with the pressure plate 29. Likewise, as the frictional member 23 described above, the frictional member 24 is formed with the grooves 23a in the same manner as those of the frictional member 23.

The rotational member 25 is an annular member fixed to the output shaft 100 of the engine (not illustrated), by means of the bolts 31 for example (see FIG. 2). The rotational member 25 is formed with threaded bores, which are threadedly engaged with the bolts 28, at a vicinity of an axially (radially) outer portion. The rotational member 25 is in contact with the support plate 26.

The support plate 26 is an annular plate member formed into a predetermined shape. The support plate 26 is one of the components structuring the limiter mechanism. The support plate 26 is provided between the rotational member 25 and the cover plate 27 and fixed to the rotational member 25 with the cover plate 27 by means of the bolts 28 at a vicinity of a radially outer portion of the support plate 26 (see FIGS. 2, 6 and 7). The support plate 26 is formed with plural openings 26a, which are formed at positions respectively corresponding to plural protrusions 29a of the pressure plate 29. The opening portions 26a are structured to prohibit the support plate 26 from rotating relative to the pressure plate 29 and to allow the support plate 26 to move in the axial direction. The support plate 26 is distant from the cover plate 27 at a radially inner side of the support plate 26. The support plate 26 is in contact with one end of the disc spring 30 at its surface at the side of the cover plate 27, i.e., at its right surface in FIG. 2.

The cover plate 27 is an annular plate member formed into a predetermined shape (see FIGS. 1 and 2). The cover plate 27 is also one of the components of the limiter mechanism. The cover plate 27 is provided between the support plate 26 and collar portions of the bolts 28 at the vicinity of a radially outer portion. Therefore, the cover plate 27 is fixed to the rotational member 25 with the support plate 26 by means of the bolts 28. That is, the cover plate 27 and the support plate 26 are connected to the output shaft 100 of the engine via the rotational member 25. The cover plate 27 is distant from the support plate 26 at the radially inner portion. In addition, the cover plate 27 is slidably in contact with the frictional member 23 at its radially inner portion.

The bolts 28 are provided for fixing the support plate 26 and the cover plate 27 to the rotational member 25. The bolts 28 are inserted into bores formed at the support plate 26 and those formed at the cover plate 27, and are threadedly engaged with the rotational member 25 (see FIG. 2).

The pressure plate 29 is an annular member provided between the disc spring 30 and the frictional member 24, and is biased towards the frictional member 24 by the disc spring 30. The pressure plate 29 is also one of the components of the limiter mechanism. The pressure plate 29 is formed with the plural protrusions 29a at an outer periphery. The plural protrusions 29a are prohibited from rotating relative to the openings 26a of the support plate 26 and are allowed to move in the axial direction.

The disc spring 30 is provided between the support plate 26 and the pressure plate 29 and biases the pressure plate 29 towards the frictional plate 24. The disc spring 30 is also one of the components of the limiter mechanism. That is, the limiter mechanism is configured to interpose the frictional members 23 and 24 between the cover plate 27 and the pressure plate 29 with a predetermined pushing force. Further, the limiter mechanism is configured to transmit a relative torque generated between the output shaft 100 and the input shaft 200. When the limiter mechanism is transmitted with a torque greater than a predetermined torque, the limiter mechanism slips and discontinues a transmission of the relative torque.

According to the first embodiment, the shortest circumferential length A (minimum dimension) between the two adjacent grooves 23a and the depth B of the groove 23a are designed within the above-described dimensional ranges, respectively. Therefore, it is possible to reduce the ratio of fibers exposed on the surface of the frictional member 23 while the stiffness of the frictional member 23 is maintained, thereby enabling to enhance rust-resistance of the frictional member 23. Likewise, this is applied to the frictional member 24 and the same effects are generated.

Figure 4:
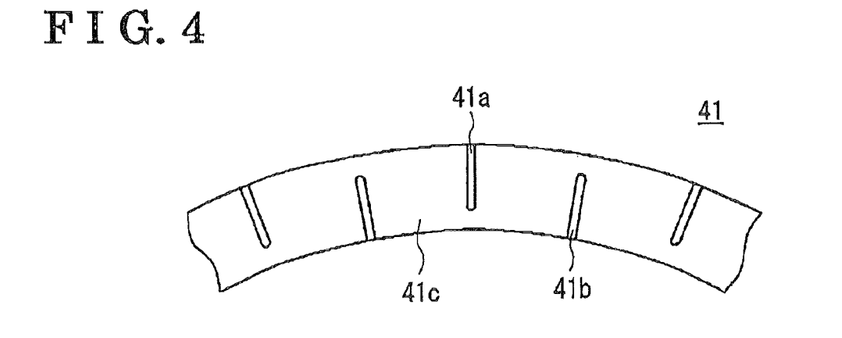
FIG. 4 is a partial plan view schematically illustrating a structure of a frictional member of a torque fluctuation absorbing apparatus according to a second embodiment.

A torque fluctuation absorbing apparatus according to a second embodiment will be described below with reference to FIG. 4. FIG. 4 is a partial plan view schematically illustrating a frictional member of the torque fluctuation absorbing apparatus.

The structure of frictional members 41 (serving as the first and second frictional members), which are attached to both surfaces of the intermediate plate (22 in FIG. 2), is different from the structure of the frictional members 23 and 24 of the first embodiment. The other structure of the apparatus of the second embodiment is substantially the same as that of the first embodiment.

Each frictional member 41 is formed with grooves 41a, 41b shaped into predetermined patterns. The grooves 41a and 41b are formed alternately at a frictional surface 41c of the frictional member 41, and the shapes of the grooves 41a and 41b are different from each other. The grooves 41a are formed by grooving the frictional surface 41c from an outer periphery of the frictional member 41, and the grooves 41b are formed by grooving the frictional surface 41c from an inner periphery thereof That is, the grooves 41a communicate with the outer periphery of the frictional member 41, and the grooves 41b communicate with the inner periphery of the frictional member 41. Because a mold is pulled out of the grooves 41a and 41b press-molded, the sidewalls of each groove 41a and 41b incline to open in a circumferential direction towards the corresponding frictional surfaces 41c. The minimum dimension from the groove 41a to the adjacent groove 41b on the frictional surface 41c is designed to be greater than or equal to 2 mm and smaller than or equal to 4 mm and smaller than or equal to 7 mm. The depth of the groove 41a, 41b is designed to be greater than or equal to 5 percent and smaller than or equal to 75 percent of the minimum dimension between the grooves 41a and 41b. The depth of the groove 41a, 41b is preferably designed to be greater than or equal to 5 percent and smaller than or equal to 50 percent of the minimum dimension between the grooves 41a and 41b.

According to the second embodiment, when comparing the second embodiment with the first embodiment, it is possible to furthermore reduce the ratio of fibers exposed on the surface of the frictional member 41 while the stiffness of the frictional member 41 is maintained, thereby enabling to furthermore enhance rust-resistance of the frictional member 41.

Figure 5A:
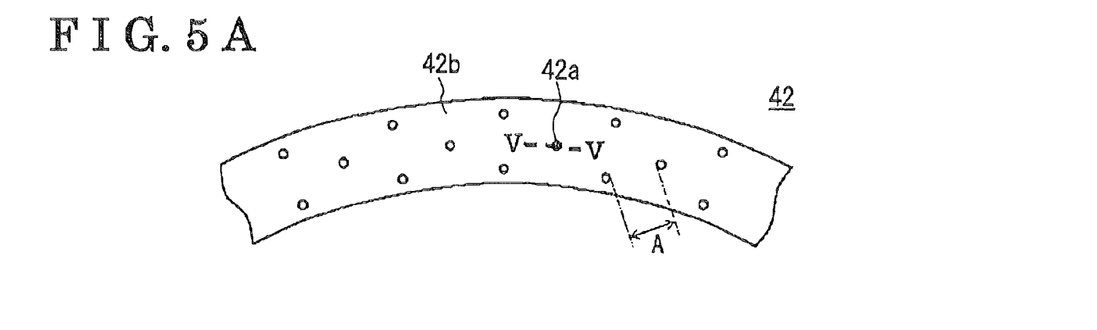
FIG. 5A is a partial plan view schematically illustrating the structure of a frictional member of the torque fluctuation absorbing apparatus according to a third embodiment.
Figure 5B:
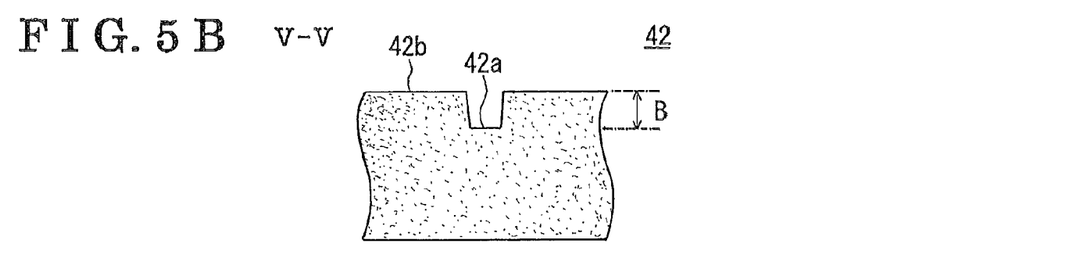
FIG. 5B is a partially sectional view taken along a line V-V in FIG. 5A.

A torque fluctuation absorbing apparatus according to a third embodiment will be described below with reference to FIGS. 5A and 5B. FIG. 5A is a partial plan view schematically illustrating a frictional member of the torque fluctuation absorbing apparatus, and FIG. 5B is a sectional view of the frictional member taken along a line V-V in FIG. 5A.

The structure of frictional members 42 (serving as the first and second frictional members), which are attached to both surfaces of the intermediate plate (22 in FIG. 2), is different from the structure of the frictional members 23 and 24 of the first embodiment. The other structure of the apparatus of the third embodiment is substantially the same as that of the first embodiment. The frictional member 42 is press-molded and includes a fibrous substrate, resin and friction modifier. The frictional member 42 is formed with multiple bores 42a, each of which includes a bottom The number of the bores 42a is equal to or greater than sixty for each frictional member 42. The shape of each bore 42a may be any desired shape, for example circular, elliptic and polygonal shapes. Because a mold is pulled out of the bores 42a press-molded, the sidewalls of each bore 42a incline to open in a circumferential direction towards the corresponding frictional surfaces 42b. The minimum dimension A from the bore 42a to the adjacent bore 42a on the frictional surface 42b is designed to be greater than or equal to 2 mm and smaller than or equal to 10 mm. The minimum dimension A thereof is preferably designed to be greater than or equal to 4 mm and smaller than or equal to 10 mm. The depth B of the bore 42a is designed to be greater than or equal to 5 percent and smaller than or equal to 75 percent of the minimum dimension A. The depth B of the bore 42a is preferably designed to be greater than or equal to 5 percent and smaller than or equal to 50 percent of the minimum dimension A.

As described above, according to the third embodiment, even though the frictional member 42 is not formed with grooves but with bores, it is possible to reduce the ratio of fibers exposed on the surface of the frictional member 42 while the stiffness of the frictional member 42 is maintained, thereby enabling to enhance rust-resistance of the frictional member 42.

Figure 6:
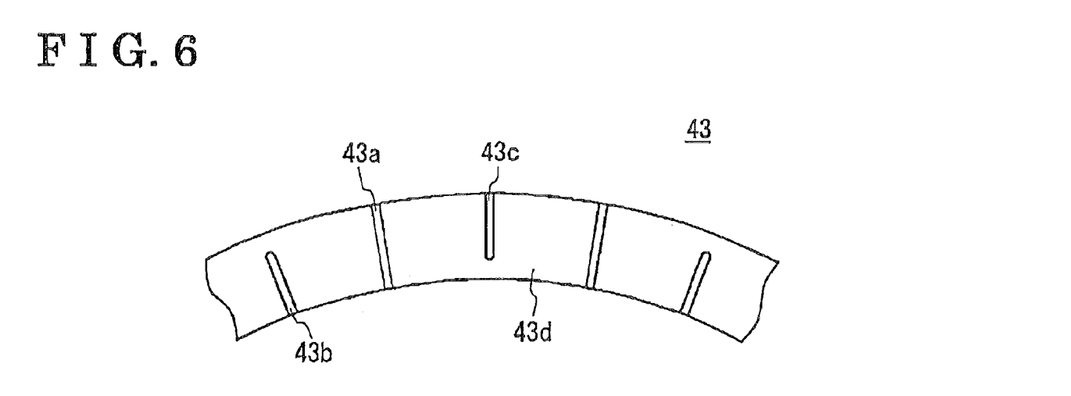
FIG. 6 is a partial plan view schematically illustrating a structure of a frictional member of a torque fluctuation absorbing apparatus according to a fourth embodiment.
Figure 7:
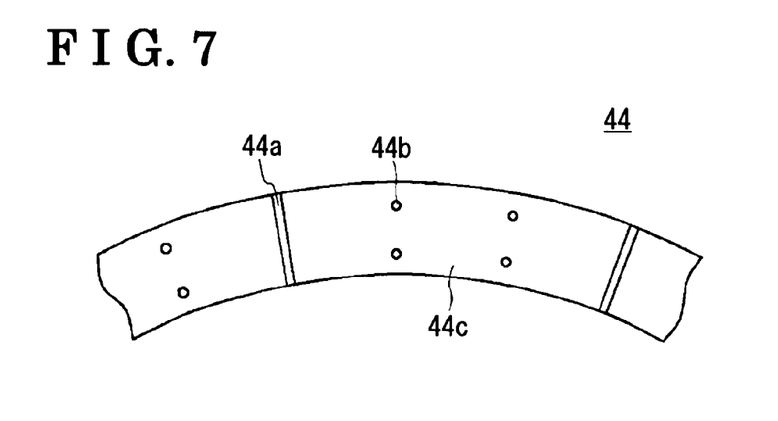
FIG. 7 is another partial plan view schematically illustrating a structure of a frictional member of a torque fluctuation absorbing apparatus according to the fourth embodiment.
Figure 8:
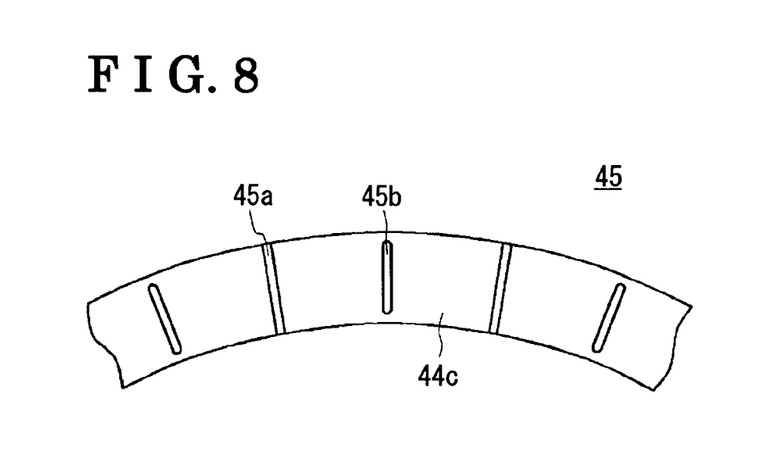
FIG. 8 is another partial plan view schematically illustrating a structure of a frictional member of a torque fluctuation absorbing apparatus according to the fourth embodiment.

A torque fluctuation absorbing apparatus according to a fourth embodiment will be described below with reference to FIGS. 6, 7 and 8. FIGS. 6, 7 and 8 are partial plan views schematically illustrating frictional members of the torque fluctuation absorbing apparatus according to the fourth embodiment.

In FIG. 6, the torque fluctuation absorbing apparatus includes frictional members 43, each of which is formed with grooves 43a, which are structured in the same manner as the grooves 23a of the first embodiment, and grooves 43b, 43c, which are structured in the same manner as the grooves 41a, 41b of the second embodiment. Here, the grooves 43a communicate with the outer and inner peripheries of the frictional member 43 and the grooves 43b and 43c communicate with either the outer or inner periphery of the frictional member 43. In FIG. 7, the torque fluctuation absorbing apparatus includes frictional members 44, each of which is formed with grooves 44a, which are structured in the same manner as the grooves 23a of the first embodiment, and bores 44b with bottoms, which are structured in the same manner as the bores 42a of the third embodiment. In FIG. 8, the torque fluctuation absorbing apparatus includes frictional members 45, each of which is formed with grooves 45a, which are structured in the same manner as the grooves 23a of the first embodiment, and bores 45b, which are changed from the bores 42a of the third embodiment.

According to the fourth embodiment, it is possible to reduce the ratio of fibers exposed on the surface of each frictional member 43, 44 and 45 while the stiffness of each frictional member 43, 44 and 45 is maintained, thereby enabling to enhance rust-resistance of each frictional member 43, 44 and 45.

Figure 9A:
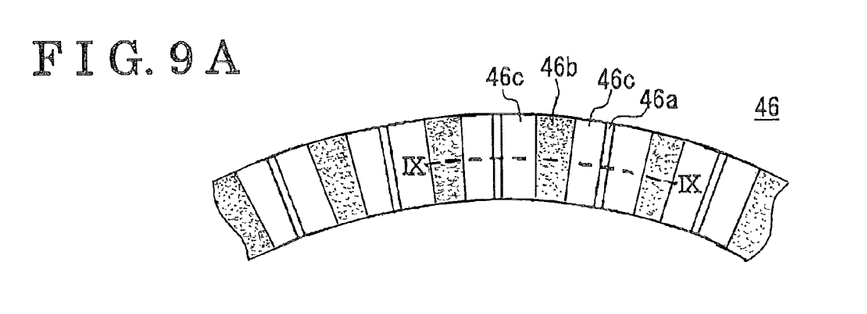
FIG. 9A is a partial plan view schematically illustrating the structure of a frictional member of the torque fluctuation absorbing apparatus according to a fifth embodiment.
Figure 9B:
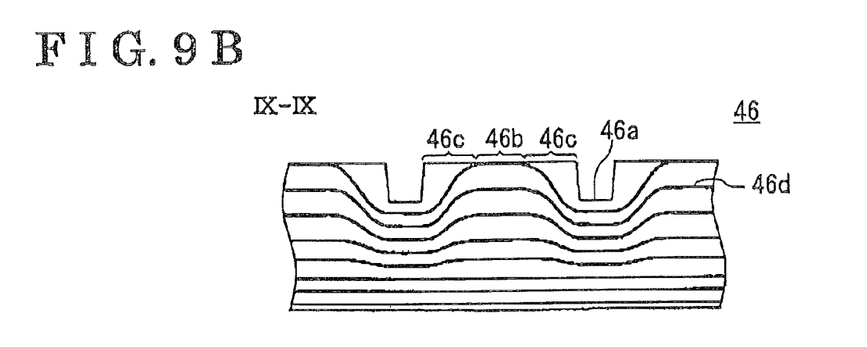
FIG. 9B is a partially sectional view taken along a line IX-IX in FIG. 9A.

A torque fluctuation absorbing apparatus according to a fifth embodiment will be described below with reference to FIGS. 9A and 9B. FIG. 9A is a partial plan view schematically illustrating the structure of a frictional member of the torque fluctuation absorbing apparatus according to a fifth embodiment. FIG. 9B is a partially sectional view taken along a line IX-IX in FIG. 9A.

In the torque fluctuation absorbing apparatus of the fifth embodiment, the ratio of the fibers exposing on a frictional surface of each frictional member 46 is specified, and the other structure of the frictional member 46 is the same as that of the frictional member 23/24 of the first embodiment. More specifically, the area of the frictional surface 46b, where a fibrous substrate 46d is exposed, over the frictional surface of the frictional member 46, is designed to be equal to or less than 50 percent out of the entire frictional surface including a frictional surface 46c where the fibrous substrates 46d are not exposed. The area of the frictional surface, where the fibrous substrate is exposed, 46b corresponds to a fiber-exposing ratio. Therefore, it is possible to enhance rust-resistance of the frictional member 46.

Figure 10:
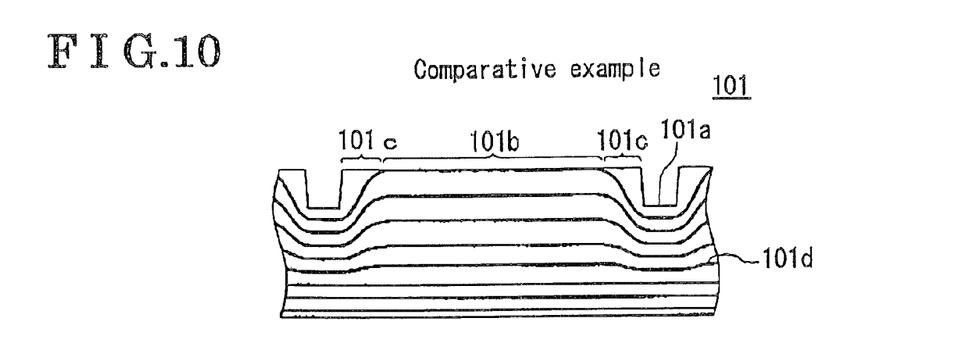
FIG. 10 is a partially sectional view schematically illustrating a structure of a frictional member of a torque fluctuation absorbing apparatus according to a comparative example.
Figure 11:
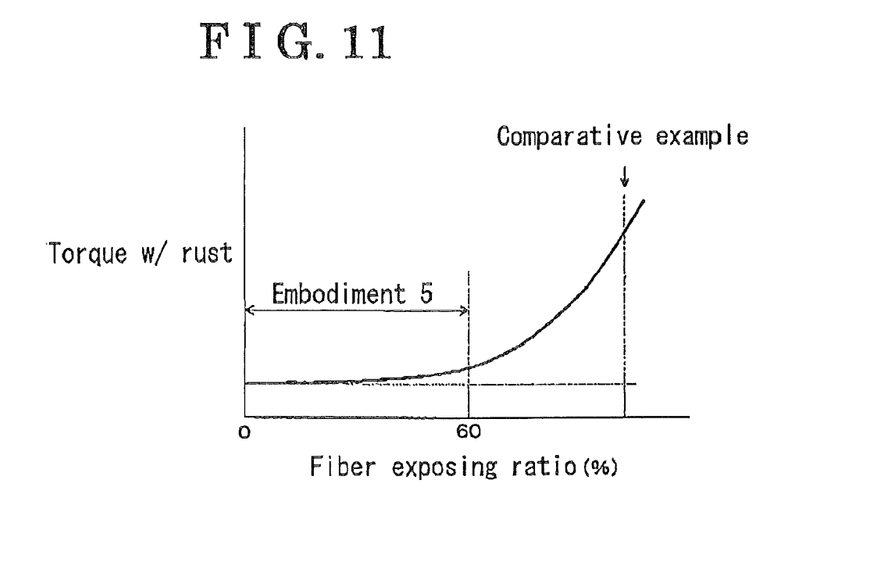
FIG. 11 is a diagram for explaining a characteristic of "Torque with rust" relative to a fiber exposing ration on a frictional member.

FIG. 11 is a diagram for explaining a characteristic of "Torque with rust" relative to the fiber-exposing ratio on the frictional member. "Torque with rust" is a torque generated in a situation where rust is produced between the frictional member and the plate slidably in contact with the frictional member. When the fiber-exposing ratio falls in a range between 0 percent and 60 percent (inclusive 0 and 60 percents) per unit area, the "torque with rust" is increased gradually. Meanwhile, when the fiber-exposing ratio exceeds 60 percent per unit area, the "Torque with rust" is increased geometrically. According to the fifth embodiment, because the fiber-exposing ratio is designed less than 60 percent (see FIG. 9), changes in "torque with rust" from the condition with no rust to the condition with rust are small and stable. Meanwhile, as explained by the comparative example (conventional work) in FIG. 10, when a frictional member 101 exhibits a fiber-exposing ratio over 80 percent, changes or fluctuations in "Torque with rust" from the condition with no rust to the condition with rust are large and unstable.

Figure 12:
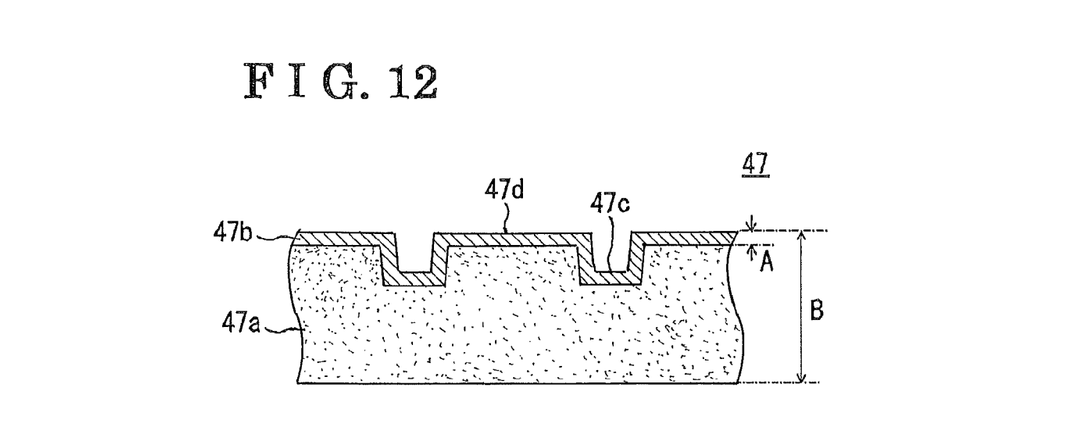
FIG. 12 is a partially cross-sectional view schematically illustrating the structure of the torque fluctuation absorbing apparatus according to a sixth embodiment.

A torque fluctuation absorbing apparatus according to a sixth embodiment will be described below with reference to FIG. 12. FIG. 12 is a partial plan view schematically illustrating a frictional member of the torque fluctuation absorbing apparatus according to the sixth embodiment.

The torque fluctuation absorbing apparatus of the sixth embodiment includes frictional members 47, each of which exhibits a two-layer structure having a base portion 47a containing therein fibers and a coating portion 47b not containing fibers. The other structure of the frictional member 47 is substantially the same as that of the frictional member 23/24 of the first embodiment. The base portion 47a and the coating portion 47b are integrally structured into the frictional member 47. The base portion 47a includes a fibrous substrate, resin and frictional modifier. The base portion 47a is formed with recesses corresponding to fibrous substrate but resin and frictional modifier. The linear-type grooves 47c are formed from the inner periphery to the outer periphery on the surface of the coating portion 47b. The thickness A of the coating portion 47b is equal to or less than 40 percent of the entire thickness B of the frictional member 47. So configured, the fibers are not exposed on the surface of the frictional member 47 while the stiffness of the frictional member 47 is maintained, thereby enhancing rust-resistance of the frictional member 47.

Figure 13A:
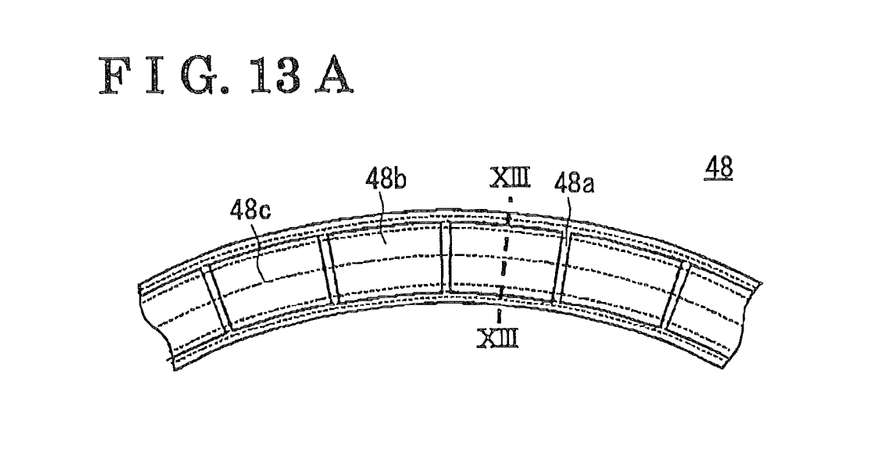
FIG. 13A is a partial plan view schematically illustrating a structure of a frictional member of a torque fluctuation absorbing apparatus according to a seventh embodiment.
Figure 13B:
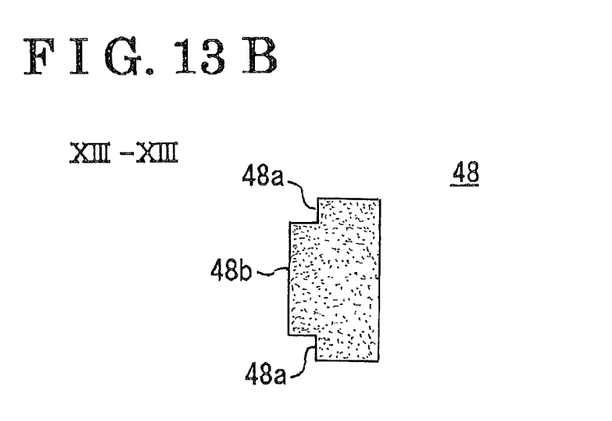
FIG. 13B is a partially sectional view taken along a line V-V in FIG. 13A.

A torque fluctuation absorbing apparatus according to a seventh embodiment will be described below with reference to FIG. 13. FIG. 13A is a partial plan view schematically illustrating a frictional member of the torque fluctuation absorbing apparatus according to the seventh embodiment. FIG. 13B is a sectional view of the frictional member taken along a line XIII-XIII in FIG. 13A.

The torque fluctuation absorbing apparatus of the seventh embodiment includes frictional members 48, each of which includes a frictional substrate 48c at the vicinities of the inner and outer peripheries at high density. The other structure of the frictional member 48 is substantially the same as that of the frictional member 23/24 of the first embodiment. The frictional member 48 includes a fibrous substrate 48c, resin and frictional modifier and the densities of the fibrous substrate 48c at the vicinities of the inner and outer peripheries are set at high levels. For example, the density of the fibrous substrates 48c at the vicinities of the inner and outer peripheries of the frictional member 48 is equal to or greater than 120 percent or equal to or less than 150 percent relative to the fibrous density at the radially intermediate portion of the frictional member 48. Stepped portions 48a are formed entirely or partially at the periphery of the frictional surface 48b including the vicinities of the inner and outer peripheries of the frictional member 48. As described above, because the stepped portions 48a are formed at the vicinities of the inner and outer peripheries of the frictional member 48 having a property of high fibrous density, it is possible to reduce the fiber-exposing ratio on the frictional surface 48b, thereby enabling to enhance rust-resistance of the frictional member 48.

Figure 14:
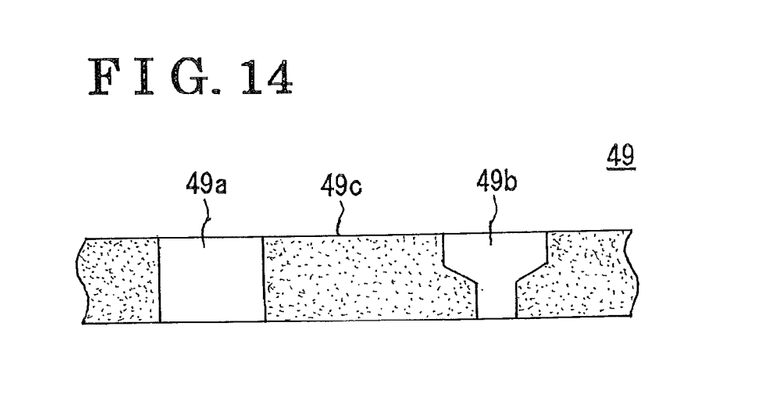
FIG. 14 is a partial plan view schematically illustrating a structure of a frictional member of a torque fluctuation absorbing apparatus according to an eighth embodiment.

A torque fluctuation absorbing apparatus according to an eighth embodiment will be described below with reference to FIG. 14. FIG. 14 is a partial plan view schematically illustrating a frictional member of the torque fluctuation absorbing apparatus according to the eighth embodiment.

The torque fluctuation absorbing apparatus of the seventh embodiment includes frictional members 49, each of which includes through holes 49a having an identical diameter so that the frictional member 49 is riveted and fixed to an adjacent component. The other structure of the frictional member 49 is substantially the same as that of the frictional member 23/24 of the first embodiment. The frictional member 49 includes a fibrous substrate, resin and frictional modifier. The frictional member 49 is formed not only with the through holes 49a but also with stepped bores 49b. The through holes 49a and the stepped bores 49b are alternately formed in the circumferential direction as riveting bores. The through holes 49a have an identical diameter and is molded with a die. The sidewalls of each through hole 49a does not exhibit a cut surface of a fibrous substrate. Each stepped bore 49b includes a step at which a collar of a rivet (not illustrated) is hooked. Each stepped bore 49b is formed to have the largest diameter at the side of a frictional surface 49c, and the diameter is reduced from the intermediate portion in thickness in a downward direction in FIG. 14. Although it is preferable that the stepped bores 49b are molded with a die, they may be formed by drilling. Although a cut surface of the fibrous substrate may occur when the stepped bores 49b are drilled, a portion of the stepped bore 49b having a small diameter may restrain an amount of cut surfaces of the fibrous substrate to be produced. Accordingly, it is possible to restrain deterioration of stiffness of the frictional member 49.

Further, according to the eighth embodiment, riveting and cutting fibrous substrates upon processing less reduce stiffness of the frictional member 49.

Figure 15A:
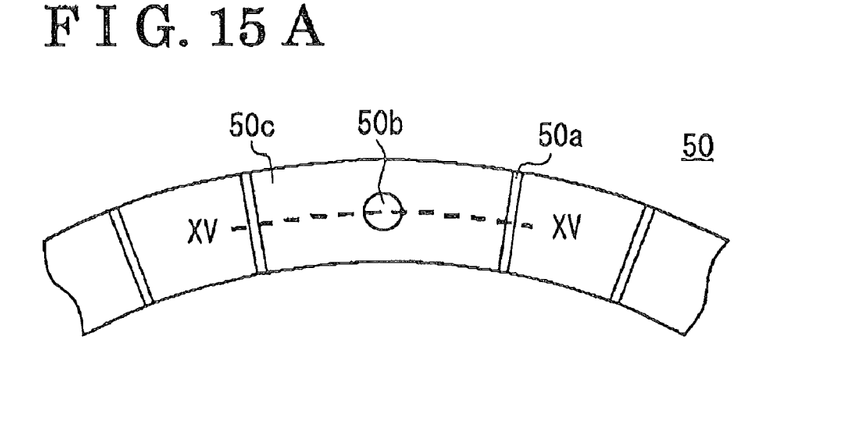
FIG. 15A is a partial plan view schematically illustrating a structure of a frictional member of a torque fluctuation absorbing apparatus according to a ninth embodiment.
Figure 15B:
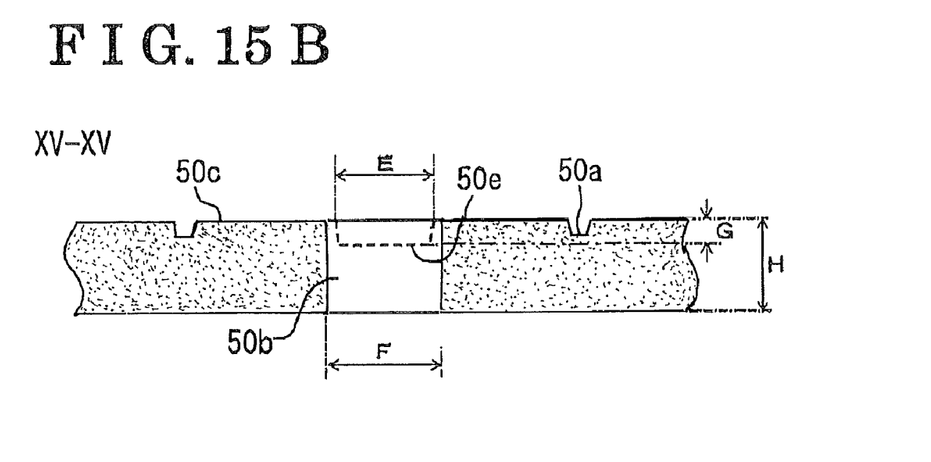
FIG. 15B is a partially sectional view taken along a line V-V in FIG. 15A.
Figure 16:
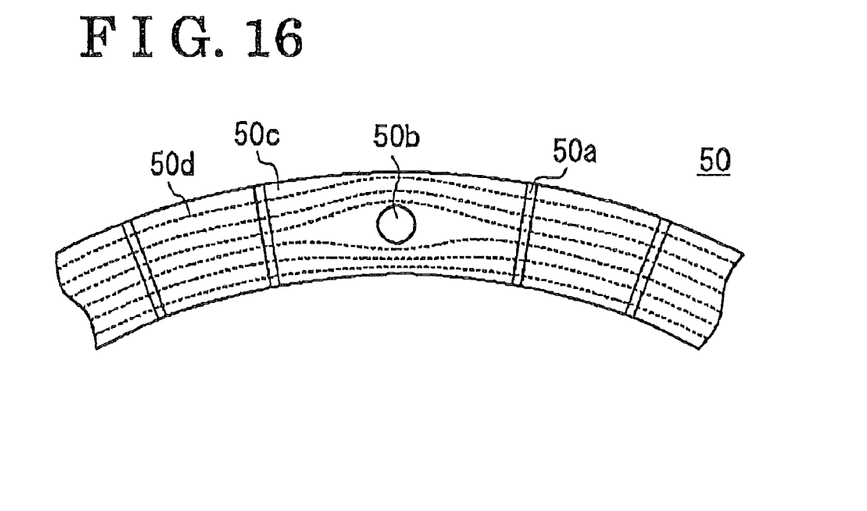
FIG. 16 is another partial plan view schematically illustrating a structure of a frictional member of a torque fluctuation absorbing apparatus according to the ninth embodiment.
Figure 17:
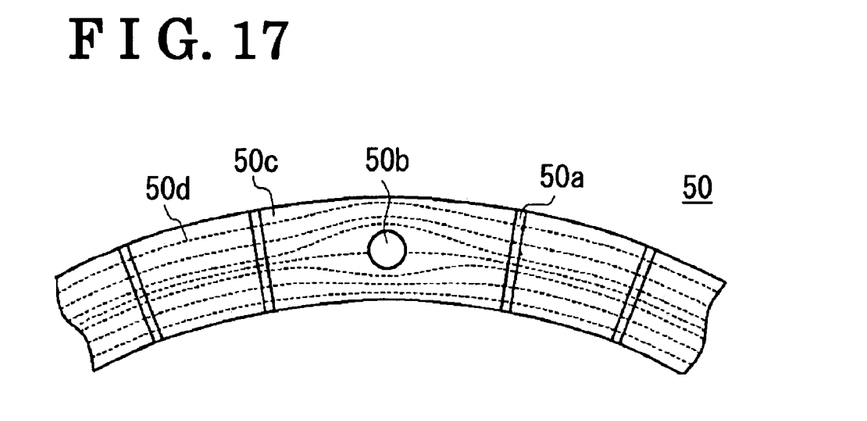
FIG. 17 is another partial plan view schematically illustrating a structure of a frictional member of a torque fluctuation absorbing apparatus according to the ninth embodiment.

A torque fluctuation absorbing apparatus according to a ninth embodiment will be described below with reference to FIG. 15. FIG. 15A is a partial plan view schematically illustrating the structure of a frictional member of the torque fluctuation absorbing apparatus according to the ninth embodiment. FIG. 15B is a sectional view of the frictional member taken along a line XV-XV in FIG. 15A. FIGS. 16 and 17 are partial plan views schematically illustrating an arrangement of a fibrous substrate of the frictional member according to the ninth embodiment.

Figure 18:
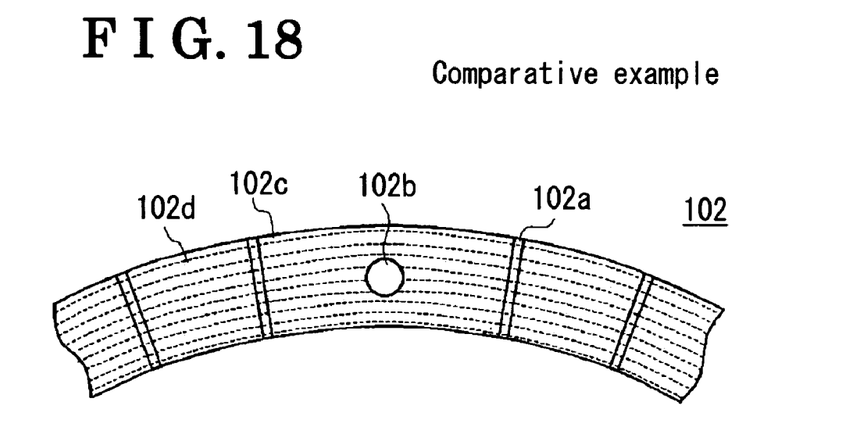
FIG. 18 is a partial plan view schematically illustrating an arrangement of fibrous substrates on a frictional member of a torque fluctuation absorbing apparatus according to a comparative example.

In the torque fluctuation absorbing apparatus of the ninth embodiment, the positional relationship between through holes 50b for riveting and grooves 50a on a frictional member 50 and an arrangement of a fibrous substrate (50d in FIGS. 16 and 17) are specified. The other structure of the frictional member 50 is substantially the same as the one of the frictional member 23/24 of the first embodiment. As illustrated in FIG. 15A, grooves 50a extend from the inner periphery to the outer periphery on a frictional surface 50c of the frictional member 50 with a predetermined distance therebetween in a circumferential direction of the frictional member 50. The grooves 50a can be the grooves or bores according to the second, third and fourth embodiments. Because a mold is pulled out of each groove 50a, the sidewalls of the groove 50a are inclined to open towards the frictional surface 50c. The frictional member 50 is formed with the through holes 50b by drilling at predetermined positions on the frictional surface 50c. The through holes 50b are formed so as no to interfere the grooves 50a. The frictional member 50 is formed by press-molding and drilling and includes fibrous substrates 50d, resin and frictional modifier. The fibrous substrates 50d are formed so as to avoid the through holes 50b (see FIG. 16). Accordingly, the fibrous substrates 50d are prevented from being cut off when drilling the through holes 50b, thereby preventing reduction in stiffness of the frictional member 50. Further, the fibrous substrates 50d may be included in the frictional member 50 in a manner that a density of the fibrous substrates 50d at an area, where the through holes 50b are formed, is set to a low level and a density thereof at the vicinities of the inner and outer peripheries of the area, where the through holes 50b are formed, is set to a high level (see FIG. 17). In this case, although the fibrous substrates 50d are cut, moldability of the frictional member 50 is improved compared to the one illustrated in FIG. 16. Still further, as a comparative (conventional) example in which fibrous substrates 102d are arranged at a uniform density over a frictional member 102 (see FIG. 18), the fibrous substrates 102d are cut by through holes 102b, thereby reducing stiffness of the frictional member 102.

In order to each through hole 50b, a groove 50a and a recess 50e are formed in a frictional surface 50c by a press-molding. Here, the diameter E of the recess 50e is designed to be greater than or equal to 50 percent and smaller than or equal to 90 percent of the diameter F of the through hole 50b. The depth G of the recess 50e is designed to be greater than or equal to 30 percent and smaller than or equal to 50 percent of the height H of the frictional member 50. Sequentially, the through hole 50b is drilled at a position corresponding to the recess 50e.

According to the ninth embodiment, riveting and cutting fibrous substrates upon processing less reduce stiffness of the frictional member 49.

As described above, a depth B of each groove is designed to be greater than or equal to 5 percent and smaller than or equal to 75 percent of the minimum dimension A between the two adjacent grooves 23a/41a/41b/43a/43b/43c/44a/45a/45b/46a/47c/48a.

The frictional member 44 includes a plurality of bores 44b having bottoms respectively and formed into a predetermined shape.

According to an other aspect, as illustrated in FIG. 5, the frictional member 42 including a fibrous substrate and formed with a plurality of bores 42a having bottoms respectively at the frictional surface 42b, the bores 42a being formed at the quantity of sixty or more and into a predetermined shape.

A minimum dimension A between two adjacent bores 42a from among the plurality of bores 42a is designed to be greater than or equal to 2 mm and smaller than or equal to 10 mm.

A depth B of each bore 42a is designed to be greater than or equal to 5 percent and smaller than or equal to 75 percent of the minimum dimension A between the two adjacent bores 42a.

The frictional surface 23b includes a first frictional surface at which the fibrous substrate is exposed and a second frictional surface at which the fibrous substrate is not exposed, and an area of the first frictional surface is designed to be less than or equal to 50 percent of an entire area of the frictional surface including the second frictional surface.

As described above, it is possible to reduce a fiber exposing ratio on a surface of a frictional member while stiffness of the frictional member is ensured, thereby enabling to enhance a performance of the limiter mechanism. Further, as a result of ensuring stiffness of the frictional member, the limiter mechanism is downsized (reduction in width and depth dimensions), thereby enabling to reduce a manufacturing cost of the limiter mechanism. Especially, the limiter mechanism described above is appropriate to a hybrid-type vehicle which has a limited space to mount a limiter mechanism.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque fluctuation absorbing apparatus including a limiter mechanism arranged between a driving-side member and a driven-side member, the limiter mechanism being configured to transmit a relative torque generated between the driving-side member and the driven-side member and to discontinue a transmission of the relative torque greater than a predetermined value, the limiter mechanism comprising:

a disc member connected to one of the driving-side member and the driven-side member a first plate and a second plate connected to the other one of the driving-side member and the driven-side member;

a frictional member fixed to the disc member and interposed between the first plate and the second plate, the frictional member including a frictional surface slidably in contact with the first and second plates;

the frictional member including a fibrous substrate and formed with a plurality of grooves at the frictional surface, a smallest dimension between two adjacent grooves from among the plurality of grooves being greater than or equal to 2 mm and smaller than or equal to 7 mm; and wherein the frictional surface includes a first frictional surface at which the fibrous substrate is exposed and a second frictional surface at which the fibrous substrate is not exposed, and an area of the first frictional surface is less than or equal to 50 percent of an entire area of the frictional surface including the second frictional surface.

2. A torque fluctuation absorbing apparatus according to claim 1, wherein the frictional member includes a plurality of bores having bottoms respectively and formed into a predetermined shape.

3. A torque fluctuation absorbing apparatus according to claim 1, wherein the frictional member is an annular-shaped plane member and the grooves include a first groove and a second groove all extending in a radial direction of the frictional member, the first groove communicates with an outer periphery of the frictional member and the second groove communicates with an inner periphery of the frictional member.

4. A torque fluctuation absorbing apparatus according to claim 3, wherein the first groove and the second groove are arranged alternately in a circumferential direction of the frictional member.

5. A torque fluctuation absorbing apparatus according to claim 1, wherein the frictional member is an annular-shaped plane member and the grooves include a first groove and a second groove all extending in a radial direction of the frictional member, the first groove communicates with inner and outer peripheries of the frictional member and the second groove communicates with either the inner or outer periphery of the frictional member.

6. A torque fluctuation absorbing apparatus including a limiter mechanism arranged between a driving-side member and a driven-side member, the limiter mechanism being configured to transmit a relative torque generated between the driving-side member and the driven-side member and to discontinue a transmission of the relative torque greater than a predetermined value, the limiter mechanism comprising:

a disc member connected to one of the driving-side member and the driven-side member a first plate and a second plate connected to the other one of the driving-side member and the driven-side member;

a frictional member fixed to the disc member and interposed between the first plate and the second plate, the frictional member including a frictional surface slidably in contact with the first and second plates;

the frictional member including a fibrous substrate and formed with a plurality of grooves at the frictional surface, a smallest dimension between two adjacent grooves from among the plurality of grooves being greater than or equal to 2 mm and smaller than or equal to 7 mm;

wherein a depth of each groove is greater than or equal to 5 percent and smaller than or equal to 75 percent of the smallest dimension between the two adjacent grooves; and wherein the frictional surface includes a first frictional surface at which the fibrous substrate is exposed and a second frictional surface at which the fibrous substrate is not exposed, and an area of the first frictional surface is less than or equal to 50 percent of an entire area of the frictional surface including the second frictional surface.

7. A torque fluctuation absorbing apparatus according to claim 6, wherein the frictional member includes a plurality of bores having bottoms respectively and formed into a predetermined shape.

8. A torque fluctuation absorbing apparatus according to claim 6, wherein the frictional member is an annular-shaped plane member and the grooves include a first groove and a second groove all extending in a radial direction of the frictional member, the first groove communicates with an outer periphery of the frictional member and the second groove communicates with an inner periphery of the frictional member.

9. A torque fluctuation absorbing apparatus according to claim 8, wherein the first groove and the second groove are arranged alternately in a circumferential direction of the frictional member.

10. A torque fluctuation absorbing apparatus according to claim 6, wherein the frictional member is an annular-shaped plane member and the grooves include a first groove and a second groove all extending in a radial direction of the frictional-member, the first groove communicates with inner and outer peripheries of the frictional member and the second groove communicates with either the inner or outer periphery of the frictional member.

* * * * *